US012778110B2

(12) United States Patent
Grant

(10) Patent No.: US 12,778,110 B2
(45) Date of Patent: Nov. 3, 2026

(54) DANDELION, WEED AND SOIL INJECTOR

(71) Applicant: Robert Howard Grant, Warren, CT (US)

(72) Inventor: Robert Howard Grant, Warren, CT (US)

(73) Assignee: Robert Howard Grant, Warren, CT (US)

( * ) Notice: Subject to any disclaimer, the term of this patent is extended or adjusted under 35 U.S.C. 154(b) by 0 days.

(21) Appl. No.: 18/436,236

(22) Filed: Feb. 8, 2024

(65) Prior Publication Data

US 2025/0255291 A1 Aug. 14, 2025

(51) Int. Cl.

| | |
|---|---|
| ***A01M 21/00*** | (2006.01) |
| ***A01C 23/02*** | (2006.01) |
| ***A01G 29/00*** | (2006.01) |
| ***A01M 21/04*** | (2006.01) |

(52) U.S. Cl.
CPC ......... *A01M 21/043* (2013.01); *A01C 23/026* (2013.01); *A01G 29/00* (2013.01)

(58) Field of Classification Search
CPC .......... A01M 21/04; A01G 29/00; B05B 1/00; B05B 1/02; B05B 1/06; B05B 15/65; B05C 11/00; B05C 17/00593
See application file for complete search history.

(56) References Cited

U.S. PATENT DOCUMENTS

| | | | | |
|---|---|---|---|---|
| 4,031,833 A * | 6/1977 | Ibanez | A01C 23/02 | 111/7.1 |
| 4,624,194 A * | 11/1986 | Zinck | A01C 23/02 | 111/7.2 |
| 5,050,340 A * | 9/1991 | Seifert | A01G 29/00 | 47/48.5 |
| 6,598,908 B1 * | 7/2003 | Wosik | F16L 25/00 | 285/334.5 |
| 7,165,357 B2 * | 1/2007 | Burgess | A01G 29/00 | 47/57.5 |
| 8,373,999 B1 * | 2/2013 | Eifert | H05K 7/02 | 361/804 |
| 9,541,076 B1 * | 1/2017 | Weiss | A01M 21/00 | |
| 10,441,763 B2 * | 10/2019 | Groop | A61M 35/00 | |
| D980,685 S * | 3/2023 | Su | | |
| 2005/0000154 A1 * | 1/2005 | Perriello | A01N 43/76 | 47/58.1 |
| 2007/0274783 A1 * | 11/2007 | Hibbard | E02B 11/00 | 405/43 |

(Continued)

*Primary Examiner* — Joshua J Michener
*Assistant Examiner* — Henry Hooper Mudd

(57) ABSTRACT

A needle injector used in the Landscape Services to inject the soil getting to the root of a plant [FIG. 1 #1] with the purpose of killing the plant with herbicide flowing through the needle and out the holes [FIG. 1 #4]. Typical weed control is done by pulling the weeds with a tool or by hand, not very effective as weeds grow back when pulled, there is always some root left behind to regrow. This invention kills the weed at the root and it dies and disintegrates on its own. It is an easily used device by connecting it to a garden pump sprayer or similar device [FIG. 2 #5 and 6] and using pressure to drive the herbicide into the root. It is 6" long. {FIG. 1. number 3} to get the deep roots. It can be used with fertilizers as well, getting near or on the roots.

1 Claim, 1 Drawing Sheet

(56) References Cited

U.S. PATENT DOCUMENTS

Figures 1, 2:
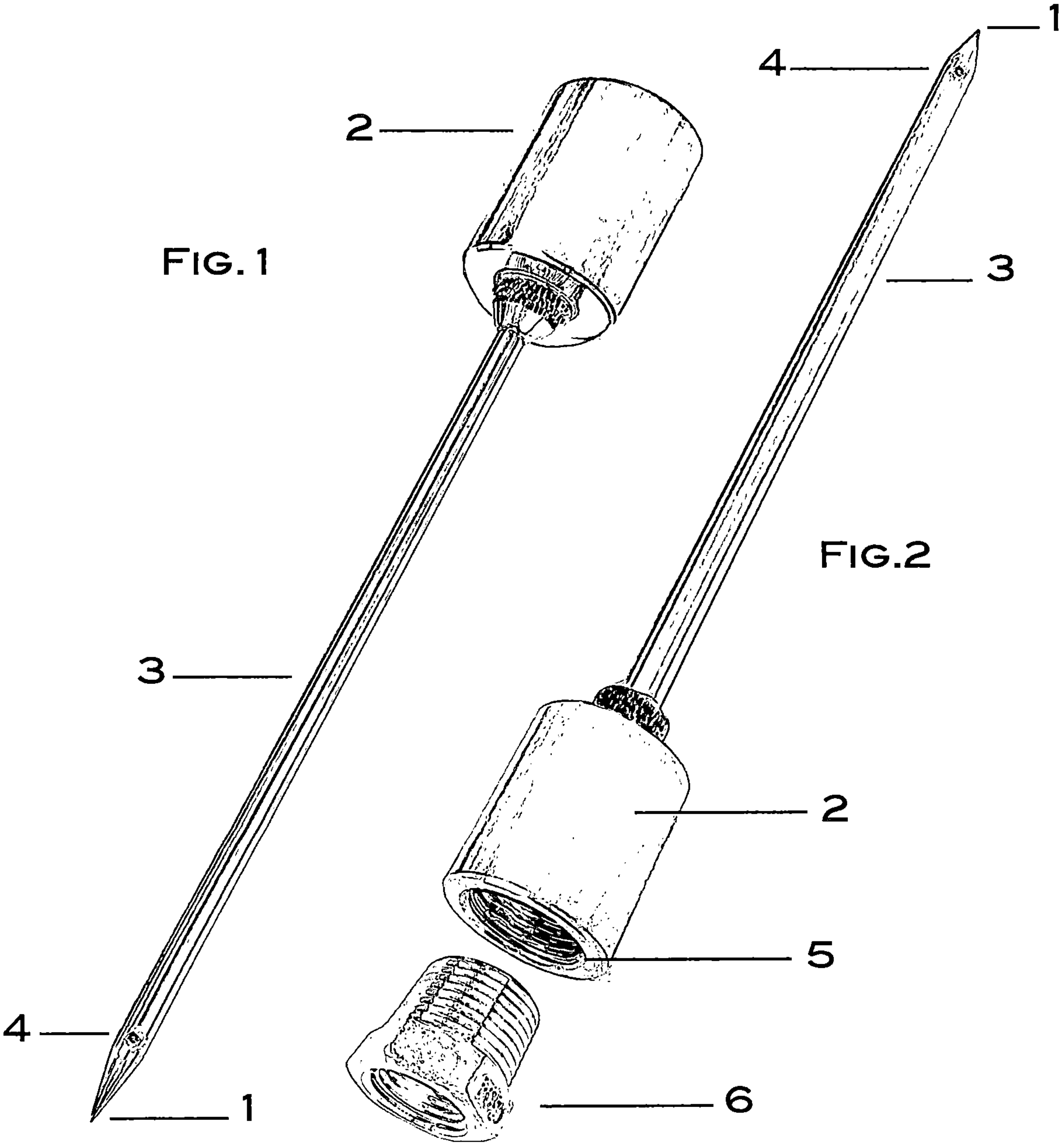

| | | | | | |
|---|---|---|---|---|---|
| 2009/0241414 | A1* | 10/2009 | Van Adrichem | A01G 29/00 | 47/57.5 |
| 2010/0306912 | A1* | 12/2010 | McCabe | A61H 35/00 | 4/443 |
| 2011/0253803 | A1* | 10/2011 | Kennedy | B67D 7/08 | 239/71 |
| 2011/0283609 | A1* | 11/2011 | Leach | A01M 7/00 | 47/1.43 |
| 2020/0113146 | A1* | 4/2020 | Auguste | A01G 29/00 | |
| 2022/0192113 | A1* | 6/2022 | Barker | A01G 31/02 | |
| 2022/0295693 | A1* | 9/2022 | Wu | A01C 23/04 | |
| 2023/0397549 | A1* | 12/2023 | NewDelman | A01G 25/06 | |
| 2024/0023477 | A1* | 1/2024 | NewDelman | A01C 5/04 | |

* cited by examiner

DANDELION, WEED AND SOIL INJECTOR

BACKGROUND OF THE INVENTION

In the course of our experience in lawn care we found no acceptable way to successfully eradicate weeds, in particular, dandelions. We experimented for a year and found by injecting the roots with herbicide we had achieved our goal. Pulling weeds always leaves some broken off root to regrow. Thus we invented the Dandelion, Weed and Soil Injector. Also we discovered it can be used for fertilizing roots as well.

SUMMARY

This invention, the Dandelion, Weed and Soil Injector, injects herbicide directly to the root of a weed/plant to kill it without the need of physically pulling or removing the plant by hand or tool. It has a long needle with holes near the tip and attaches to a source at the other end which delivers liquid through the needle to the intended target inserted into the soil at the root under pressure from the source tank. Alternately, it can be used to inject and fertilize directly to the root of plants as well. It is unique to the marketplace.

DRAWINGS

Included are 2 perspective views FIG. 1 and FIG. 2 of the invention indicating size from distal end FIG. 1 number 1, to FIG. 1 number 2 the other distal end being a length of 7 inches. There is a sharp point at the tip, FIG. 1 number 1 and FIG. 2 number one. This is designed for easy penetration into the soil. There is a small hole near the tip, FIG. 1 number 4, and FIG. 2 number 4 to dispense liquid. There is a threaded end on each FIG. 1 and FIG. 2 only visible on FIG. 2 number 5. This is to connect to a garden type sprayer. FIG. 1 and FIG. 2 number 6 is the needle shaft constructed of stainless steel ⅜" in diameter. FIG. 1 and FIG. 2, number 2, is the base which allows connection to the host sprayer, previously called a garden type sprayer. FIG. 2 number 6, is an adaptor to allow sprayers with different size fittings to be connected.

DESCRIPTION

This device may be used for dandelions, weeds and any other reason to inject a liquid herbicide directly into the soil to the root. It relates to the field of Landscape Services. It can also be used for injecting liquid fertilizer as well. It can be constructed in plastic or metal. It is roughly 6" long and ⅛$^{th}$ inch thick/wide with an adaptor that connects to its host tank. There is a pointed tip to insert into the soil to the root of a weed/plant and 2 holes at the tip to dispense the liquid. The opposing end connects to a source holding the liquid, under pressure, as in a common garden sprayer. To dispense the liquid a trigger on the source tank is engaged forcing the liquid through the needle and into the root of the plant destroying the root structure. This invention is a great improvement over conventional weeders as it kills the plant at the root without pulling the plant. Not only does the plant die off and disappear on its own, there are no holes in the turf from pulling plants/weeds. It attaches to a manual pump garden sprayer, or any type of instrument/device to propel the liquid through the needle into the root. The needle is long enough, to reach the base of the root thereby killing it on contact. For weeds, the purpose is to inject the root thereby destroying the plant without needing to physically pull the plant out of the ground. The plant will die and in and in several days dry up and disappear on its own. It differs from pulling weeds as in pulling there is always some root left in the ground to regrow at a later time, not so with injection, the root is destroyed. Pulling is far less effective. This invention is new and different from anything else due to the injection action and getting Into the root for its effectiveness. All other weeders depend on physically pulling the plant or surface spraying the plant with herbicide. That distinguishes our injector as unique and new to the marketplace. Also, we recommend using a 30% vinegar solution as the herbicide as it is Eco/Earth friendly and will not disturb the normal ecosystem of the soil as, opposed to chemical herbicides. Alternatively, the injector can be used to inject liquid fertilizer directly to the root of any plant, instantly accessing the root immediately as opposed to surface fertilization.

FIG. 1 and FIG. 2 show perspective views of the same object. There is a point at one distal end number 1, and a fitting at the other distal end, number 2. Number 3 in each view show the needle approximately 6 inches in length ⅛ in thick. Number 4 is a drilled hole through the tip, allowing liquid to flow through 2 holes in the tip. There is a cavity through the entire length allowing liquid to pass from one distal end to the other. Number 5, FIG. 2 is a ⅜ NPT [national pipe thread] fitting to attach to a source tank thread. Number 6, FIG. 2 is a reducer fitting allowing use on a ¼ NPT [national pipe thread] source tank. So inserting number 6 into number 5 gives the option for different source tank connections.

The invention claimed is:

1. An apparatus configured for injecting fluid into a root of a plant using pressurized air killing the root comprising: a needle having a needle length and a longitudinal axis extending through said needle length; said longitudinal axis also extending through both a proximal end and a distal end wherein the distal end is configured for insertion into a soil; a dispensing hole proximal to said distal end, wherein said dispensing hole is spaced apart from said distal end;

- the proximal end comprising a threaded fitting configured to make an airtight seal onto a pressurized container and comprising a reducer fitting for an air tight seal on alternate sources;
- the needle having a needle diameter;
- the threaded fitting having a threaded fitting diameter;
- said needle diameter being lesser in value than said threaded fitting diameter;
- a tapered support connector located between said needle and said threaded fitting,
- said tapered support connector being frustoconical;
- the reducer fitting comprising an interior threaded surface and an exterior threaded surface,
- the exterior threaded surface configured for threaded attachment to said threaded fitting;
- the reducer fitting further comprising a hexagonal distal end;
- said reducer fitting further configured to create an airtight seal with the threaded fitting;
- said reducer fitting further configured to create an airtight seal at the hexagonal distal end.

* * * * *